(12) United States Patent
Desmeules

(10) Patent No.: US 12,526,882 B2
(45) Date of Patent: Jan. 13, 2026

(54) CONTROL DEVICE WITH ACCESSIBLE SYMMETRICAL INPUT CONNECTOR

(71) Applicant: Brooke Erin DeSantis, Montreal (CA)

(72) Inventor: Alain Desmeules, Montreal (CA)

(73) Assignee: Brooke Erin DeSantis, Montreal (CA)

( * ) Notice: Subject to any disclaimer, the term of this patent is extended or adjusted under 35 U.S.C. 154(b) by 708 days.

(21) Appl. No.: 17/974,234

(22) Filed: Oct. 26, 2022

(65) Prior Publication Data

US 2024/0147580 A1 May 2, 2024

(51) Int. Cl.
*H05B 1/02* (2006.01)
*A41D 1/00* (2018.01)
*G01D 5/24* (2006.01)
*H02J 7/00* (2006.01)
(Continued)

(52) U.S. Cl.
CPC ............ *H05B 1/0272* (2013.01); *A41D 1/002* (2013.01); *G01D 5/24* (2013.01); *H02J 7/00032* (2020.01); *H02J 7/0013* (2013.01); *H02J 7/0048* (2020.01); *H02J 7/0063* (2013.01); *H02J 7/342* (2020.01);
(Continued)

(58) Field of Classification Search
CPC H05B 1/0272; H05B 2203/036; A41D 1/002; A41D 2400/12; A41D 13/0051; G01D 5/24; H02J 7/00032; H02J 7/0013; H02J 7/0048; H02J 7/0063; H02J 7/342; H05K 3/28
See application file for complete search history.

(56) References Cited

U.S. PATENT DOCUMENTS

2013/0091904 A1* 4/2013 Kim .................. D06F 34/34
68/3 R
2015/0230524 A1* 8/2015 Stevens ............... H05B 1/02
219/494

(Continued)

*Primary Examiner* — Robert G Bachner
(74) *Attorney, Agent, or Firm* — Guy J. Houle; Houle Patent Agency Inc.

(57) ABSTRACT

A control device for mounting in electrical heated wearables for controlling power to electrical heating wires secured in the heated wearables and capable of charging one or more portable batteries associate therewith and communicating data relative thereto. The control device has a finger-operable switch integrated with electronic circuits mounted on a pcb board. The electronic circuits include a communication circuit to interface with a wearer person to provide message information to the wearer person. The electronic circuits has power input terminals adapted to receive operating voltage from the one or more portable batteries. The pcb board with the finger-operable switch, the wiring connections and the electronic circuits are encapsulated by waterproof material. A female USB symmetrical input connecting port is mounted at a user accessible location on the control device and isolated from the pcb board and the electronic circuits by a further waterproof material. The female USB symmetrical input connecting port has a cable connection capable of transmitting power and data to the electronic circuits and power input terminals. The female USB symmetrical input connecting port is oriented to provide access to a symmetrical male plug connector secured to a power supply cable capable for supplying voltage from an auxiliary battery supply or charger and for the transmission of data information.

19 Claims, 4 Drawing Sheets

(51) Int. Cl.
  *H02J 7/34* (2006.01)
  *H05K 3/28* (2006.01)
(52) U.S. Cl.
  CPC ........... *H05K 3/28* (2013.01); *A41D 2400/12* (2013.01); *H05B 2203/036* (2013.01)

(56) References Cited

U.S. PATENT DOCUMENTS

2017/0035602 A1* 2/2017 Shapiro .................. A61F 7/007
2021/0388979 A1* 12/2021 Maderic ............... A41D 27/085

* cited by examiner

CONTROL DEVICE WITH ACCESSIBLE SYMMETRICAL INPUT CONNECTOR

FIELD OF THE INVENTION

The present invention relates to controls for electrically heated wearables and more specifically to an improved control device having an accessible female USB symmetrical connector mounted on the control device for receiving a male USB symmetrical plug connector capable of supplying charging voltage and data to the control device and portable battery and permitting external communication with a wireless device concerning the state of the portable battery and information provided by sensors.

BACKGROUND OF THE INVENTION

Heated wearables, such as articles of apparel, with accessible control devices to provide a user person an external means to control the supply of voltage to the heating wires or heating pads secured in patterns secured in the article of apparel to thereby control the temperature of the heated wearable are known. Such control devices may be secured to the outer shell of the article of apparel or made accessible in a pocket thereof. These control devices have several wires connected to a circuit board provided with electronic components as well as a switch to control the intensity of the voltage supplied to the heating wires. Such control devices are seen mounted at a convenient location on heated articles of apparel providing ease of access and visibility to the switch to control the battery supplying power to the heating wires.

A portable battery is usually concealed in a pouch formed in the article of apparel, or to a belt secured about the waist of the user person, to provide ease of access to the batteries for recharge or replacement. The recharge of such batteries can be very inconvenient to the user person, particularly in a cold climate environment and for such reason it is necessary for the user person to carry spare batteries for replacement. Many such control devices are usually provided with LED lights which are positioned to be visible to the user person to indicate the charge of the battery. Accordingly, the mounting position of the control device needs to provide visual access to the user person. The electronic control circuits of these devices also require operating voltage from the battery thereby further adding to the depletion of the battery charge. To charge the battery when there is no spare substitute battery, the heated wearable is no longer generating heat and the user person must seek a convenient location where there is a supply voltage available for charging its battery. This is not always readily available and therefore the user person may find itself in a dangerous situation. Also, it is also important to secure these control devices and their batteries at locations which provide protection against bad weather conditions, such as rain or snow.

The present invention overcomes such problems and permits an article of apparel equipped with the control device of the present invention to be exposed to rain and snow and washing of the garment. This is made possible by providing a waterproof control device equipped with a waterproof female symmetrical port, such as a USB type C port, to provide for the charging of the portable battery and in other applications the communication of data from the trigger switch to external power supply sources and controllers.

Because these control devices are permanently secured to the article of apparel, damage may be caused to the device electronic circuits and wiring of the printed circuit board during the cleaning process. Known control devices and their associated remote charging port and wiring form a bulky package and therefore their securement is somewhat limited to certain types of article of apparel, usually limited to installation on jackets, vests, or other appropriate body garments.

Electrically heated gloves, for example, requires the fabrication of a sleeve which is sufficiently long to accommodate a small pocket in which a small thin battery is contained and a connector to the battery supply. The pocket is usually closed by a zipper type closure to seal the pocket to protect the battery against water infiltration. Once the battery is depleted of its charge, the user person needs to open the pocket, retrieve the battery from the pocket, which is usually small providing difficult access, and disconnect the battery from its connection. The battery then requires to be connected to a charging supply. This process is then reversed to re-install the battery in its pocket. Such process requires frequent manipulation of the battery which will eventually cause wear and damage and often loss due to its frequent removal from the glove. For the battery to resist to such frequent manipulation it is required to have a battery which is more robust and accordingly larger and heavier and which is heavier in the wrist portion of the wearer person making it very uncomfortable. Also, the frequent manipulation of the battery eventually causes premature wear and breakage of the zipper closure. Still further, the user person often forgets to charge the battery defeating the heated feature or for a remaining charge which may be limited to a very short period of time causing the user person to seek alternative measures to keep warm.

It is further pointed out that it is not always possible to have easy access to the control device. For example, the trigger switch may be mounted on heated socks under pants, or on a base layer buried under a multitude of insulated layers and outerwear. It may also be advantageous to have one trigger switch on a heated article of apparel to communicate with other switch controls, such as in the case of a right heated glove and a left heated glove and a right heated sock and a left heated sock. That way, in addition to supply power, a cable with a USB type C plug can also transmit data and therefore control the functions of the trigger switch or multiple trigger switches at the same time. An additional way in which transmitting data is useful, would be to secure sensors to the garment that are integrated with the heating system, such as body temperature sensors, capacitive presence sensors, accelerometers, wind sensors, etc. These sensors may be used to provide additional; information to the logic circuits of the printed circuit board to permit for the control device to better manage the heat, the user experience and securities associated with the heating elements. These sensors may feed one main logic board made power source which is located somewhere else in the article of apparel. The sensor information can also be sent wirelessly to other electronic devices, such as a smart phone.

SUMMARY OF THE INVENTION

It is a feature of the present invention to provide a control device for electrically heated wearables, such as articles of apparel, and which overcomes the above-mentioned problems of the prior art control devices and which provide additional features and benefits to the user person.

A further feature of the present invention is to provide a control device for heated wearables wherein the control device is provided with a charging port to provide for connection of an auxiliary battery supply when the portable battery which supplies power to the heating wire circuits of an article of apparel becomes depleted. Accordingly, a user person can plan an extended outdoor stay in cold weather conditions beyond the charging capacity its the portable battery by simply carrying a certain quantity of auxiliary batteries together with a charging cable to connect into the charging port after the portable battery is depleted.

Another feature of the present invention is to provide a control device equipped with a charging port to receive an auxiliary cable connection to provide operating voltage to heating wires of a heated wearable from one or more auxiliary batteries when the portable battery associated with the heating wire circuits of the wearable becomes depleted and permitting a user person to plan an outdoor excursion wearing a heated article of apparel much longer than the time period of the portable battery.

It is another feature of the present invention to provide a control device for electrically heated articles of apparel and which is fully integrated in a waterproof envelope structure, including a female USB symmetrical connecting port, mounted exteriorly on the control device for ease of access by a user person to connect a charger other electronic hubs and auxiliary power supply, a battery or batteries to the input power terminals of the circuitry to charge a portable battery and/or to provide an auxiliary operating voltage and data to the heating electrical wires of the wearable with the internal portable battery removed or not for charging thereby continuing the heated function of the heated wearable.

A further feature of the present invention is to provide a control device for electrically heated articles of apparel and which is fully integrated, compact and waterproof and provided with a small USB Type C female connector which does not require visible access to connect a male USB Type C plug connector due to its symmetrical shape.

Another feature of the present invention is to provide a control device that can be adapted to several types of small, heated articles of apparel, such as socks, gloves, pants, insoles, boots, headwear or other convenient articles of apparel.

A further feature of the present invention is to provide a control device for electrically heated articles of apparel and which is capable of providing communication data information to a wearer person relating to the charge state of the portable battery and also the charge state of auxiliary portable batteries or providing data received from garment sensors.

A still further feature of the present invention is to provide a control device for electrically heated wearables wherein a female USB type C port is integrated with the control device and is of waterproof construction and isolated from the printed circuit boards and its circuitry while still being part of the circuitry and the trigger switch. The opening of the female port also does not require a rubber plug to safeguard against water infiltration into the port nor does it conduct water and humidity to the circuit board and its electronic circuits.

According to the above features, from a broad aspect, the present invention provides a control device for mounting in electrical heated wearables for controlling power to electrical heating wires secured in the heated wearables and capable of charging one or more portable batteries associate therewith and communicating data relative thereto. The control device has a finger-operable switch integrated with electronic circuits mounted on a pcb board. The electronic circuits include a communication circuit to interface with a wearer person to provide message information to the wearer person. The electronic circuits have power input terminals adapted to receive operating voltage from the one or more portable batteries. The pcb board with the finger-operable switch, the wiring connections and the electronic circuits are encapsulated by waterproof material. A female USB symmetrical input connecting port is mounted at a user accessible location on the control device and isolated from the pcb board and the electronic circuits by a further waterproof material. The female USB symmetrical input connecting port has a cable connection capable of transmitting power and data to the electronic circuits and power input terminals. The female USB symmetrical input connecting port is oriented to provide access to a symmetrical male plug connector secured to a power supply cable capable for supplying voltage from an auxiliary battery supply or charger and for the transmission of data information.

BRIEF DESCRIPTION OF THE DRAWING

A preferred embodiment of the present invention will now be described with reference to the accompanying drawings in which.

DESCRIPTION OF THE PREFERRED EMBODIMENT

Figure 1:
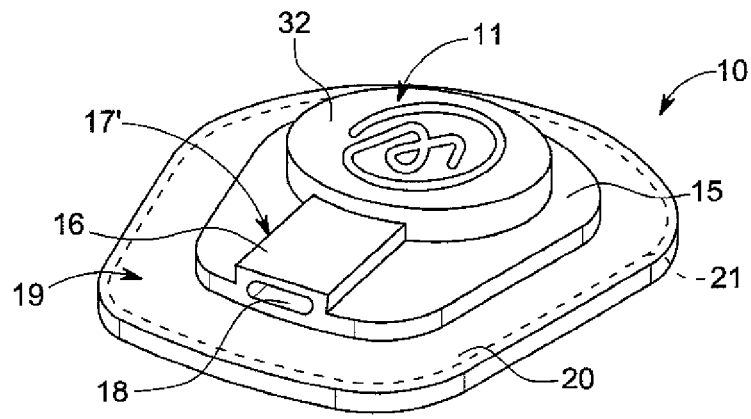
FIG. 1 is a perspective view of the control device of the present invention and showing the external female USB Type C input connecting port mounted on the outer surface of the control device adjacent the control button trigger switch for receiving a USB Type C connector plug.

This application has a relationship to my co-pending U.S. patent application Ser. No. 17/581,891, filed on Jan. 22, 2022 and entitled Control Device for Mounting on Electrically Heated Articles of Apparel, and which is incorporated herein by reference.

Before any embodiments of the application are explained in detail, it is to be understood that the application is not limited to the details of construction and the arrangement of component part set forth in the following description or illustrated by the drawings. Further, it is to be understood that the phraseology and terminology used herein is for the purpose of description and should not be regarded as limiting but should encompass equivalents thereof.

Referring now to the drawings, and more specifically to FIGS. 1 to 4, there is illustrated the control device 10 of the present invention and which is adapted for securement to various types of heated wearables, for example articles of apparel such as a jacket (shown in FIG. 6), a vest, pants, gloves, socks, insoles, boots, headwear, and other articles intended to provide warmth to a user person. It is also foreseen that the control device may be used to provide warmth to heated coverings intended to keep animals warm during cold winter months. The control device 10 is compact and totally encapsulated in a waterproof envelope, as is also described in my co-pending applications mentioned herein above. The control device 10 is provided with a finger-operable trigger switch 11 integrated with and connected to electronic circuits 12 of a pcb board 13. The electronic circuits 12 include a communication circuit, not specifically identified herein, but obvious to a person skilled in the art, to interface with a user person to provide data information to the user person. A waterproof envelope 14, as shown more clearly in FIG. 4, seals all of the electronic circuits mounted on the pcb board 13, and associated wiring as well as the finger-operable switch 11. The waterproof envelope 14 is formed by molded silicon material, or other suitable encapsulating material, defining entirely the top surface 15 of the control device 10 and surrounds the housing 16 of a female USB symmetrical input connector 17 mounted on the top surface 15 of the control device 10. The connecting port receptacle 18 is of course not sealed to permit connection of a symmetrical male plug connector 45, as shown in FIG. 5, and which will be described in more detail herein below.

The female and male USB symmetrical connectors 17 and 45 are USB Type C connectors which are about three times smaller than the standard USB Types A and B connectors which do not require visual access to orient the USB plug to its proper orientation for connection into a female connector receptacle of the same type. The USB Type C connectors are also small enough to plug into super-thin mobile devices equipped with a rechargeable battery or peripheral devices. The world industry standard is shifting to standardize with such tiny connectors due to its versability and tiny size to adapt to smaller size electronic devices and smart devices and it also reduces the problem of having to have loads of different USB cables with different connector shapes for a person's various devices.

Figure 4:
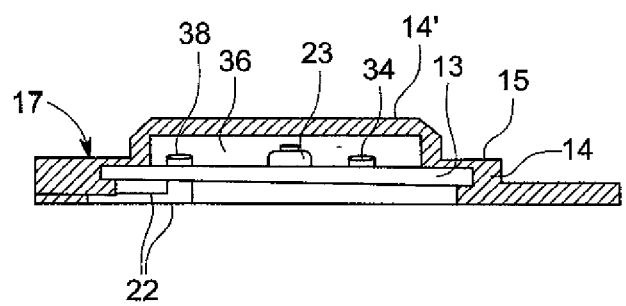
FIG. 4 is a side cross-sectional view of the control device showing the female USB symmetrical input connector and the elevated push-button switch isolated by a waterproof silicon membrane disposed over the top surface of the push-button switch and the pcb board there under which is also sealed by a silicon membrane and with the female USB symmetrical connector over molded on the outer surface of the membrane.

As shown by the cross-section view of FIG. 4, the waterproof material, herein a silicon material, completely surrounds the control device 10 which is shaped to define an elevated flexible switch actuating formation 14' in the top surface 15. The female USB symmetrical input connector 17 is mounted on the top surface 15 with the female connecting port 18 oriented in a horizontal plane and facing in a downward direction when the control device is secured to a heated wearable, such as the jacket 40 illustrated in FIG. 6. To permit the control device 10 to be secured to the jacket 40, the control device 10 is mounted on a backing patch material 19, see FIG. 2, which is dimensioned to provide a peripheral outer stitch seam receiving region 20 defined about the waterproof envelope 14 to receive connecting stitches 21 for securement to an outer surface of a jacket outer shell 29 or other locations. It is pointed out that the USB Type C female connector 17 is completely isolated from the pcb board and the only connection thereto are the wires 22 which are encapsulated in the silicon material.

Figure 5:
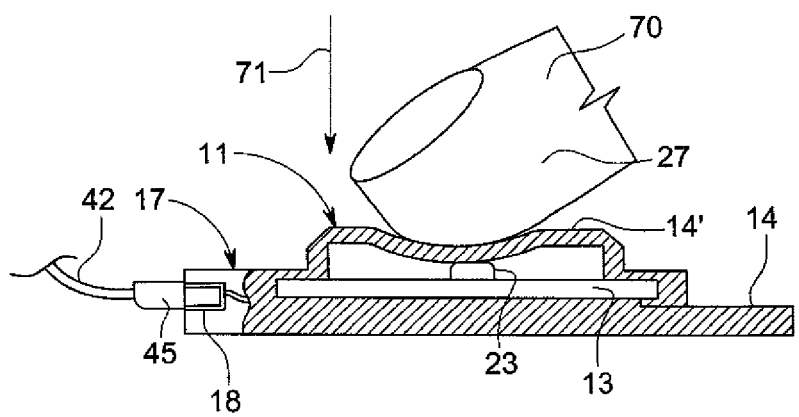
FIG. 5 is a sectional view similar to FIG. 4 showing the male USB symmetrical plug engaged in the female USB symmetrical connector and with the switch button activating membrane compressed by the finger of a user person to actuate the push-button switch to provide external auxiliary power from the auxiliary battery to the terminals of the portable battery where power is connected to the heating wire circuits.

With reference to FIGS. 4 and 5, the finger-operable switch 11 is mounted above the circuit board 13 and connected in working relationship with the electronic circuits 12 through a switch button 23 which is depressed by finger pressing the flexible membrane portion 14' of the silicon envelope 14. By depressing the switch button 23, with the use of the finger 70 in a downward direction, indicated by arrow 71, the portable battery 30 becomes connected to the input cable 28 and an operating voltage is fed to the heating wires, not shown, of the heated wearable. The switch button 23 of the switch 11 is the control of the functioning of the control device 10 which instructs the electronic circuits to perform programmed functions stored in a memory of the control circuits computer. The control device is also provided with LED lamps to communicate visual information to the user person. The female USB port 17 provides auxiliary power to charge the portable battery 30 when depleted of its charge and/or to provide power to the terminals 27 of the output cable 26 to power the heating wires. The wire connections 27 are also isolated in the silicon waterproof material 14. The power input cable 28 is provided with a plug connector 29 at a free end for connecting and removing the portable battery 30. Accordingly, the portable battery can be disconnected for charging while the auxiliary battery continues to provide the operation of the heating wire circuits. Alternatively, the portable battery can be charged by the auxiliary battery depending on the circumstances. The battery supply 30 or the auxiliary battery supply 43, see FIG. 5, can also be constituted by a battery pack conveniently located in a pocket of an article of apparel or in a belt supported by the wearer person. Further, the auxiliary battery supply may be a battery charger, With reference again to FIG. 2, there is shown a set of light emitting diodes 31 visible on the top surface 15 of the control device and mounted on the pcb board 12 and arranged with a desired configuration. The light emitting diodes 31 provide a visual indication to a user person of several programmed functions, herein a charge capacity present in the portable battery 30 or an auxiliary battery located remotely in suitable pouches of the article of apparel and connected to the wire terminals 27. It also displays the charging cycles when charging the battery connected to the pcb board, cycling from the first LED to the fourth LED, the fourth LED indicating that the battery is fully charged. The light emitting diodes 31 can also display the actual charge remaining in the portable battery 30 or battery pack associated with the article of apparel whereby the user person is provided information as to the necessity to recharge the battery or battery pack by the use of the auxiliary battery 43. The light message information provided by the light emitting diodes 31 may also be constituted by different color light emitting diodes with the color red indicating maximum heat intensity and white the minimum heat intensity provided to the heating wires secured to the article of apparel and green indicating that the battery or battery pack is fully charged. Alternatively, the information may be provided by different flashing rates of one or more of the light emitting diodes or simply by lighting different numbers of the four or more light emitting diodes 31. To power "on" or "of" the control circuit, the switch is held depressed for a predetermined time period, such as five seconds.

Figure 2:
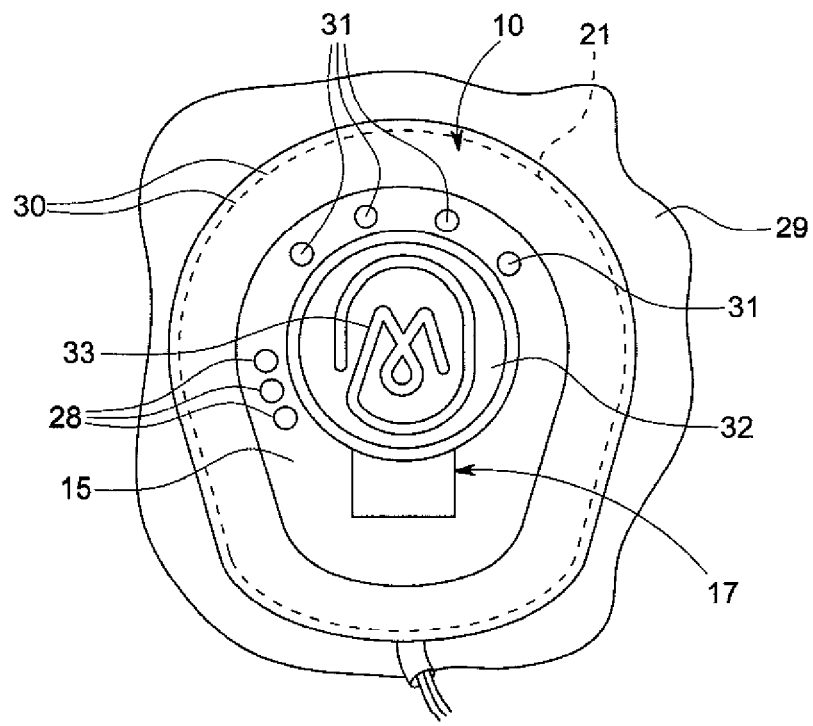
FIG. 2 is a top view of the control device, slightly modified from FIG. 1, showing associate communication LED lights mounted on the control device outer surface to provide visual information signals to a user person and a further showing the device secured to an outer fabric shell of an article of apparel.
Figure 3:
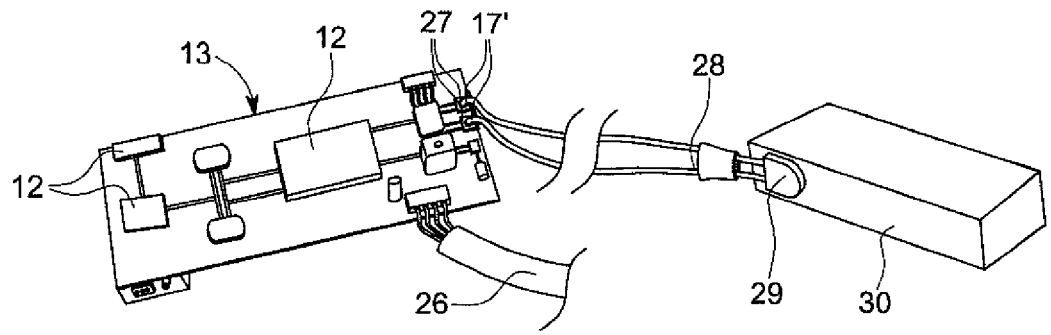
FIG. 3 is a perspective schematic view of the pcb board and associated wiring and cable connections showing a portable supply battery connected to power terminals of the pcb, an output cable containing supply wiring to heating wire circuits of the heated wearable and wire connections from the female USB symmetrical input connecting port mounted on the control device.

As shown in FIGS. 2 and 4, the top surface 32 of the switch actuation formation 14' is herein shown with a transparent logo form 33 which is illuminated by a light emitting white diode or a color diode 34 mounted on the pcb board 12 and disposed in the space 36 below the switch actuation formation 14' to provide a visual illuminated logo 37 and indicating that the power is "on" or "off". As mentioned above, the pcb board also contains a communication circuit, not shown specifically but obvious to a person skilled in the art, and it feeds other light emitting diodes 38 to provide further light information messages to the user person, such as warning signals that the charge capacity present in a battery or battery pack has only a certain remaining time of use and requires recharging or change. The communication circuit may also transmit information to a smart phone or other suitable smart devices of a wearer person and provide a switch control function. Accordingly, the communication circuit has a computer provided with a memory which is programmed to execute certain functions relating to threshold data programmed in its memory and which is made accessible to a user person, locally or remotely.

Figure 6:
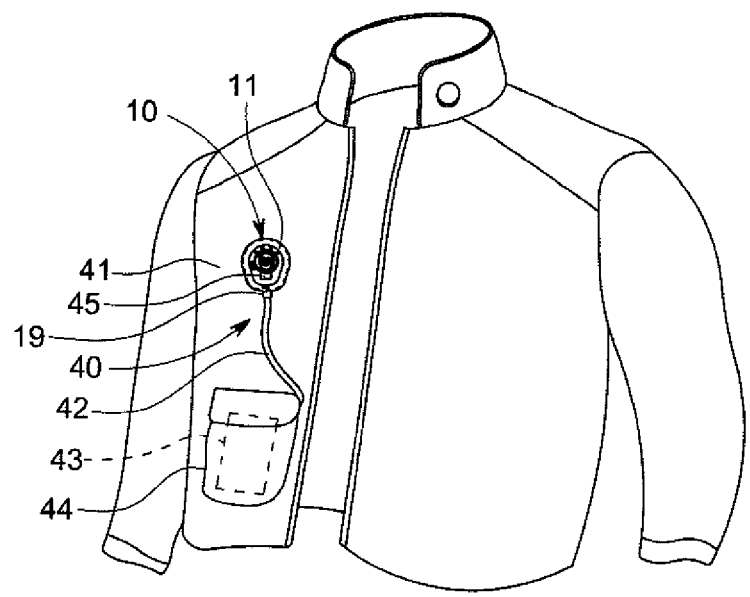
FIG. 6 is a perspective view of an article of apparel, herein a jacket, equipped with the control device and showing a battery charging cable connected to the female USB symmetrical connector of the control device providing an auxiliary battery voltage supply from an external auxiliary battery contained in a pocket to the article of apparel to provide charging voltage to the portable battery terminals of the electronic circuits.

FIG. 6 illustrates an example of the use of the control device 10 of the present invention. As herein illustrated, the control device 10 is secured to a jacket 40 and mounted on the outer surface 41 of the jacket at a convenient location, such as the chest area of a user person, for access by the hand of the wearer person. The control device 10 is mounted with the USB symmetrical connector oriented with the connecting port 18 facing downwards to protect the connecting port 18 from freezing rain, snow and wind. In this position the connecting port is not visible to the eyes of the wearer person but because the port is of symmetrical shape as well as the USB plug, the plug is easy to connect into the female connector because of its symmetrical shape, ie. there is no "up" or "down" orientation. As illustrated herein, when the portable battery 43 becomes depleted of its charge, the wearer person merely pulls out from a pocket a charging cable 42 equipped with a USB symmetrical plug connector 45, herein a USB Type C plug connector, and connects it into the female USB port 18 of the USB connector 17 of the control device 10. The other end of the charging cable 42 has a connector to connect to the auxiliary battery 43 stowed away in a pocket 44 of the jacket 40. If the auxiliary battery becomes depleted of its charge, another auxiliary battery is connected to the female USB type C port thereby extending the hours of operation of the electric heating wires providing extended comfort to the user person. Accordingly, the provision of the USB symmetrical connector in combination with the auxillary battery prevents unpleasant experiences cause by depleted portable batteries associated with heated wearables or situations where no charging power is available, and the heated function of the wearable is no longer functional. These unpleasant experiences can be hazardous to a user person's health when caught in a freezing temperatura environment.

Figure 7A:
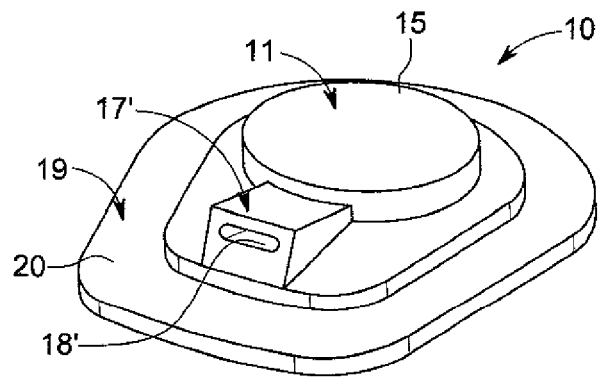
FIGS. 7A and 7B, are perspective views similar to FIG. 1, but showing different orientations of the female USB symmetrical connector mounted on the outer surface of the control device.
Figure 7B:
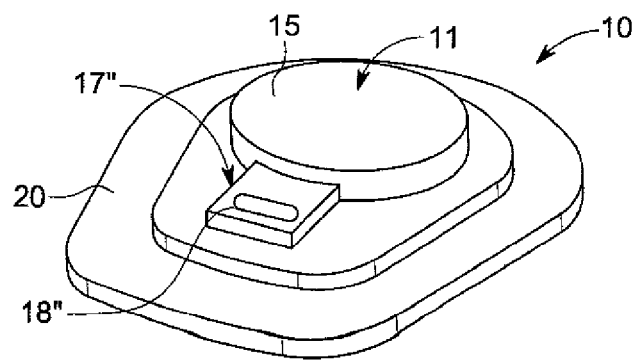

FIGS. 7A and 7B, are further illustrations of the control device 10 wherein as shown in FIG. 7A, the USB Type C female connector 17' is structured differently with its connecting port 18' oriented at an upwardly extending angle to facilitate the insertion of the male USB plug therein. FIG. 7B shows a still further orientation of the connecting port 18" of the USB female connector 17" with the connector 18 extending at right angle to the top surface of the control module. Accordingly, depending on specific intended use of the control device the connecting port of the USB female connector can be oriented differently to facilitate the connection of a USB symmetrical male plug. Such is possible with the present invention in view of the waterproof feature of the USB type C connector and the waterproof construction of the control circuitry and trigger switch.

As mentioned herein above, it is not always possible to have easy access to a control device depending on the garment piece that it is mounted on and for example, the trigger switch may be mounted on heated socks under pants, or on a base layer buried under a multitude of insulated layers and outerwear. FIG. 6 provides a solution to such problems as well as providing additional features of the present invention. As herein illustrated, the control device 10 is secured to a jacket article of apparel, and becomes a master control device 10 to control heating wire circuits in the jacket as well as other control devices associated with different types of heated wearables, a pair of heated socks 50 and 50' and a pair of heated gloves 61 and 51', see FIG. 8.

Figure 8:
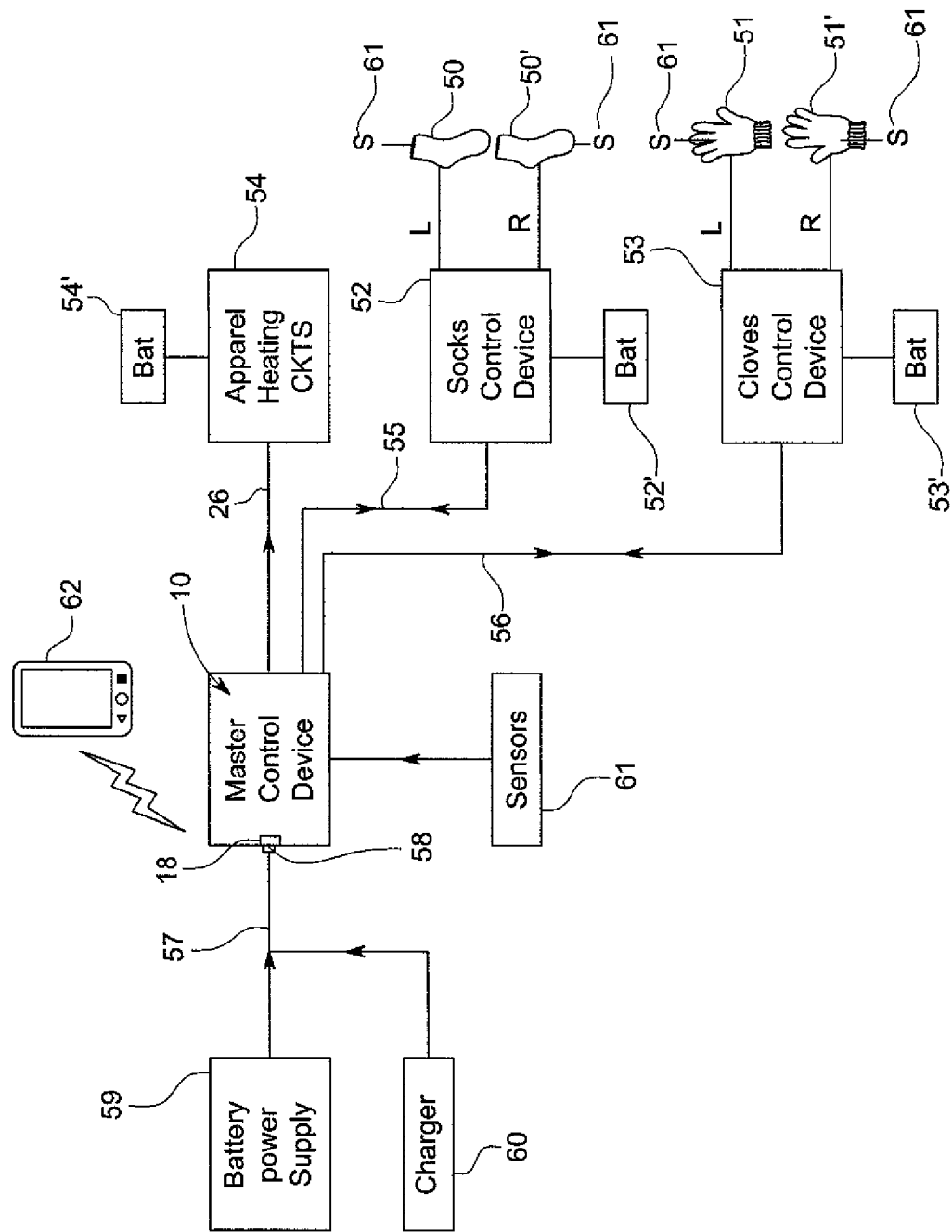
FIG. 8 is a block diagram illustrating a configuration wherein the control device is in communication with other independent heated wearables and sensors to permit the control device to more effectively manage an electrically heated garment with composite heating articles of apparel, such as gloves and socks.

As shown in FIG. 8, the master control device 10 monitors other control devices worn by a wearer person, therein the control device 52 which controls power to the socks 50 and 50' and the control device 53 which controls power to the gloves 51 and 51'. The control devices 52 and 53 each have their own portable batteries 52' and 53, respectively. The heating circuits 54, mounted in the jacket, also have their own portable battery or battery(ies) 54'. As shown the master control devices has a communication cable 55 to the socks control device 52 and a communication cable 56 to the gloves control device 53 through which can be transmitted both voltage and data. An external power supply cable 57 provided with a USB type C connecting plug 58 is connected to the female USB type C port 18 for transmitting voltage and data to the electronic circuits 12 and the power input terminals 27 on the pcb board 13 associated with the master control device 10 for charging the portable batteries 52', 53' and 54 when depleted of their charge. The external power source to the master control devices 10 may be in the form of a battery or battery bank 59 or a battery charger 60. The power source may also be provide by a cigarette lighter of a vehicle and a battery supply of a recreational vehicle.

In a further embodiment, the heating circuits of the jacket, the socks and gloves may be provided power only from a battery or battery pack worn by the wearer person through the supply cable 57 wherein the portable batteries 52', 53' and 54 would not be required. If the battery 59 becomes depleted, it is simply changed with a fully charged battery carried by the wearer person. Accordingly, by carrying a sufficient quantity of batteries, the heating articles of apparel can function for extended time periods.

As schematically illustrated, sensors 61 are associated with said one or a combination of articles of apparel worn by the wearer person. These sensors 61 feed data to the electronic circuits on the pcb board of the master control device 10 representatives of heat generated to the wearer person by their respective heating wire circuits. The communication circuit on the pcb board has a memory in which is stored threshold temperature data for comparison with the sensed temperature signals from the sensors for communication to the wearer person and for the automatic control of the heating wire circuits by the master control device to provide comfort to the wearer person during senses changes in body temperature or ambient changes in temperature. The control of the heating circuits can be performed automatically by the control device 10 without the intervention of the wearer person or manually by the wearer person though the trigger switch 11

The sensors 61 comprise one or more capacitive presence sensors as described in my co-pending U.S. patent application Ser. No. 17/882,688 filed on Sep. 7, 2022 and entitled "Presence Detection System for Heated Wearables" which are used to sense the presence of a person wearing the heating wearable, such as the pair of heating gloves 51, 51' or the pair of heating socks 50, 50'.

The master control device may also be configured for Bluetooth communication for providing data to a smart phone of the wearer person, as illustrated at 62, for remote control of the master control deice 10 without the use of the trigger switch 11.

Many modifications and other embodiments of the present invention as described above will come to mind to a person skilled in the art to which the invention pertains having the benefit of the teachings described herein above and the drawings. Hence, it is to be understood that the embodiments of the present invention are not to be limited to the specific examples thereof as described herein and other embodiments are intended to be included within the scope of the present invention and the appended claims. Although the foregoing descriptions and associated drawings describe example embodiments in the context of certain examples of the elements and members and/or functions, it should be understood that different combinations of elements or substitutes and/or functions may be provided by different embodiments without departing from the scope of the present invention as defined by the appended claims. Furthermore, although specific terms are employed herein, they are used in a generic and descriptive sense only and other equivalent terms are contemplated herein with respect to the items that they relate to. It is therefore within the ambit of the resent invention to encompass all obvious modifications of the examples of the preferred embodiment described herein provide such modifications fall within the scope of the appended claims.

The invention claimed is:

1. A control device for permanent mounting in electrical heated wearables for controlling power to electrical heating wires secured in said heated wearables and to charge one or more portable batteries associate therewith and communicating data relative thereto, said control device being secured to a backing material dimensioned to permit permanent securement to an accessible location said control device having a finger-operable switch integrated with electronic circuits mounted on a pcb board, said electronic circuits having a communication circuit to interface with a wearer person to provide message information to said wearer person, said electronic circuits having power input terminals adapted to receive operating voltage from said one or more portable batteries; said pcb board with said finger-operable switch, said wiring connections and said electronic circuits being totally encapsulated in waterproof material; a female USB symmetrical input connecting port mounted at a user accessible location on said control device and isolated from said pcb board by a further waterproof material, said female USB symmetrical input connecting port having a cable connection capable of transmitting power and data to said electronic circuits and power input terminals, said female USB symmetrical input connecting port being oriented to provide access to a symmetrical male plug connector secured to a power supply cable capable of supplying voltage from an auxiliary battery supply or charger and the transmission of data information, said finger-operable switch being a push-button switch secured to said pcb board and extending above a surface of said pcb board, said waterproof material being a flexible waterproofing material capable of retaining its shape to define an elevated flexible switch actuating formation in a top wall thereof which permit said push-button switch to be actuated when said flexible switch actuating formation is decreased by a user person's finger pushing down on said switch actuation formation.

2. The control device as claimed in claim 1 wherein said female USB symmetrical input connecting port is a USB Type C female connecting port, said USS Type C female connecting port providing for the connection thereto of a USS Type C male connecting plug.

3. The control device as claimed in claim 2 wherein said one ore more portable batteries are secured to said pcb board and controlled by said finger operable switch and said electronic circuits.

4. The control device as claimed in claim 3 wherein said one or more portable batteries are secured to said pcb board by a connecting cable capable of transmitting power and data and having a detachable connector at a free end for removable connection to said one or more portable batteries.

5. The control device as claimed in claim 4 wherein said connecting cable is connected to a supply circuit of said electronic circuits which is controlled by said push-button switch to provide for said user person to adjust the voltage intensity supplied to said electrical heating wires to adjust the heat generated by said electrical heating wires to designated areas of the body of said user person.

6. The control device as claimed in claim 5 wherein said electrical heating wires are retained in one of or a combination of a jacket, a pair of heating gloves, a pair of heating socks, pants boots and headwear articles of apparel.

7. The control device as claimed in claim 1 wherein said flexible waterproof material is formed of a silicon material shaped to define said elevated flexible switch actuating formation, said female USB symmetrical input connecting port being mounted in said top surface with said female symmetrical input connecting port oriented in a horizontal plane and facing in one of a downward, or upward and intermediate angle position when said control device is secured to said heated wearable.

8. The control device as claimed in claim 1 wherein there is further provided a set of light emitting diodes mounted on said pcb board and made visible in a top surface of said waterproof envelope, said waterproof envelope being a clear silicon material; said light emitting diodes providing a visual message information to a user person of one of a charge capacity present in said one or more portable batteries, a visual charging process when charging said one or more portable batteries, and the temperature settings of heating wire associated with said articles of apparel.

9. The control device as claimed in claim 8 wherein said set of light emitting diodes also provides said visual message information relating to the state of an auxiliary battery supply when said one or more portable batteries are depleted and being charged by said auxiliary battery.

10. The integrated control device as claimed in claim 8 wherein said light message information is provided by different color light emitting diodes with the color red indicting maximum heat intensity provided to said heating wires secured to said articles of apparel or by having a certain number of light emitting diodes t from a group of light emitting diodes.

11. The integrated control device as claimed in claim 8 wherein said light message information is provided by different flashing rates of one or more of said light emitting diodes.

12. The integrated control device as claimed in claim 1 wherein said control device is a master control device associated with heating wire circuits provided in one of or a combination of articles of apparel worn by said wearer person, an external power supply cable having a symmetrical plug and provided with wiring for transmitting voltage and data to said female USB symmetrical input connecting port to provide power to said electronic circuits and said power input terminals for the control of said heating wire circuits for the comfort of said wearer person and to manage power generated by one or more batteries connected to said external power supply cable.

13. The integrated control device as claimed in claim 12 wherein sensors are associated with said one or a combination of articles of apparel worn by said wearer person, said sensors feeding data to said electronic circuits representative of heat generated to said wearer person by said heating wire circuits, said communication circuit having a memory in which is stored threshold temperature data for comparison with sensed temperature signals for communication to said electronic circuits and wearer person for the control of said heating wire circuits.

14. The integrated control device as claimed in claim 13 wherein said one or a combination of articles of apparel worn by said wearer person is a jacket a pair of heating gloves and a pair of heating socks.

15. The integrated control device as claimed in claim 14 wherein said sensors comprise one or more capacitive presence sensors to sense the presence of a person wearing said jacket, said pair of heating gloves and said pair of heating socks.

16. The integrated control device as claimed in claim 12 wherein said one or a combination of articles of apparel are provided with designated portable batteries, one or more auxillary batteries connected to said battery supply cable to charge said designated portable batteries when depleted of its charge and provide power to its associated heating wire circuits.

17. The integrated control device as claimed in claim 12 wherein said one or a combination of articles of apparel are provided with designated portable batteries, a battery charger connected to said battery supply cable to charge said designated portable batteries when depleted of its charge and provide power to its associated heating wire circuits.

18. The integrated control device as claimed in claim 1 wherein said communication circuit generates wireless data information for Bluetooth communication to wireless devices for remote control of said master control deice without the use of said switch.

19. The integrated control device as claimed in claim 12 wherein said external battery supply cable is connected to one of an external battery or battery pack, a cigarette lighter of a vehicle and a battery supply of a recreational vehicle.

* * * * *